United States Patent
Volkmer

(10) Patent No.: US 8,122,060 B2
(45) Date of Patent: Feb. 21, 2012

(54) TRACKING OF OBJECT VERSIONS IN DIFFERENT PROJECT STAGES

(75) Inventor: Michael Volkmer, Heidelberg (DE)

(73) Assignee: SAP AG, Walldorf (DE)

(*) Notice: Subject to any disclaimer, the term of this patent is extended or adjusted under 35 U.S.C. 154(b) by 563 days.

(21) Appl. No.: 12/325,298

(22) Filed: Dec. 1, 2008

(65) Prior Publication Data

US 2010/0138454 A1   Jun. 3, 2010

(51) Int. Cl.
*G06F 7/00* (2006.01)
*G06F 17/30* (2006.01)

(52) U.S. Cl. .................. 707/802; 707/803

(58) Field of Classification Search ............ 707/802, 707/803, 806, 807, 809
See application file for complete search history.

(56) References Cited

U.S. PATENT DOCUMENTS

| | | | |
|---|---|---|---|
| 5,544,066 A * | 8/1996 | Rostoker et al. | 716/102 |
| 6,324,678 B1 * | 11/2001 | Dangelo et al. | 716/103 |
| 7,810,067 B2 * | 10/2010 | Kaelicke et al. | 717/102 |
| 7,937,281 B2 * | 5/2011 | Miller et al. | 705/7.11 |
| 2004/0143811 A1 * | 7/2004 | Kaelicke et al. | 717/101 |
| 2004/0255265 A1 * | 12/2004 | Brown et al. | 717/101 |
| 2006/0224437 A1 * | 10/2006 | Gupta et al. | 705/10 |
| 2007/0100673 A1 * | 5/2007 | Konakalla | 705/7 |
| 2009/0125831 A1 * | 5/2009 | Dandurand | 715/772 |
| 2009/0171813 A1 * | 7/2009 | Byrne et al. | 705/27 |
| 2009/0204938 A1 * | 8/2009 | Schindler et al. | 717/105 |

* cited by examiner

*Primary Examiner* — Don Wong
*Assistant Examiner* — Merilyn Nguyen

(57) ABSTRACT

A system and method to maintain versions of an object for each lifecycle stage of the object are described. The system maintains versions and archives of objects in memory. The system includes an object repository to maintain new objects. The system has a lifecycle stage module to manage lifecycle stages, an origin matrix builder to build origin matrices, an archive version manager to manage archives. The system further retrieves usages of objects across lifecycle stages using a usage logic module and compares the content of objects from different stages using a comparison module.

11 Claims, 9 Drawing Sheets

| STAGE | BPR | TP | PRO | SOL | PRE |
|---|---|---|---|---|---|
| SOURCE OBJECT ID | | | | | |
| ARCHIVE VERSION | | | | | |

FIG. 7

TRACKING OF OBJECT VERSIONS IN DIFFERENT PROJECT STAGES

FIELD OF THE INVENTION

The invention relates generally to enterprise computing, and, more specifically, to tracking of object versions in different project stages.

BACKGROUND OF THE INVENTION

Businesses today use enterprise software systems to realize every aspect of the business, such as everyday operations, controlling, reporting, human resources management, and so on. Every activity of the business is modeled in the system and employees perform their tasks in the system. Enterprise software systems are implemented in the information technology landscape of a company within complex projects usually over the course of months or years. Projects may have several different stages, for example, design, implementation, upgrade, maintenance, and so on. In each of these stages objects that build up the system are copied from one stage to the next and are modified in the next stage according to the requirements of the system. As objects are modified in different project stages, there may be a need to track and compare the content of an object from one project stage to the content of an object in another project stage. Also, there may be a need to apply the content of an object in one project stage to the content of the object in another project stage.

SUMMARY OF THE INVENTION

A system and method to track versioning and archive information about objects across project stages are described. The system stores versions and archives of objects in memory. The system includes an object repository to maintain objects. The system has a project stage module to manage project stages, an origin matrix builder to build origin matrices, and an archive version manager to manage archives. The system further retrieves usages of objects across project stages using a usage logic module and compares the content of objects from different stages using a comparison module.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 7 is an exemplary origin matrix created by the system of FIGS. 1 and 6.

DETAILED DESCRIPTION

Figure 1:
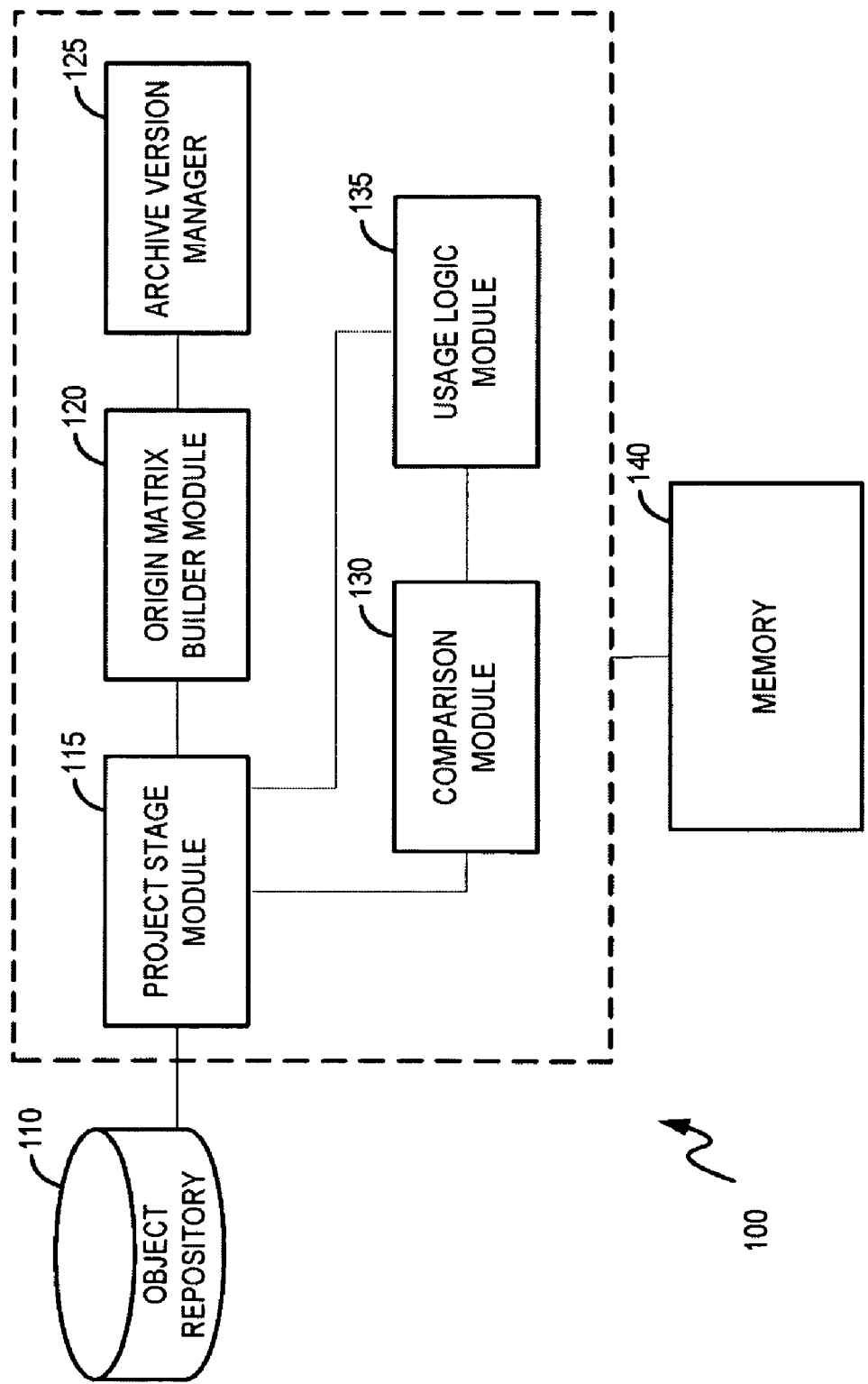
FIG. 1 is a block diagram of a system of an embodiment of the invention for tracking versions of objects and applying the content of versions from one project stage to another project stage.

A system and method to apply the content of objects from one project stage to the content of objects in another project stage are described. Hereinafter, project stage is also referred to as lifecycle stage. The project of creating an enterprise software system tailored to the needs of a specific company starts with the generation of a requirements specification. The requirements specification lists details of the business activities of the company. Based on the details in the requirements specification, the modules that may maintain the activities of the business are modeled. Based on the requirements specification, a blueprint of the enterprise software system is created. Using this blueprint, each necessary module is created. Each module may represent a software component or an activity of the company, for example, but not limited to, financial module, accounting module, sales module, logistics module, human resources module, and so on. Modules are constructed using structure elements. Structure elements represent scenarios. A scenario may be a business process used by the company and modeled in a software component. For example, in a marketing module, a scenario for campaign coordination may be modeled, which would include the activities "define target group", "schedule campaign", and "manage campaign". Structure elements are also referred to as "objects". Objects that may be used to create modules may be maintained in an object repository. For example, objects of a financial module may be a financial transaction, a financial instrument, processes modeled by the financial module, and functionalities provided by the financial module. Objects of an accounting module may be "invoicing" and other processes supported by the accounting module and features used by such processes (such as account types). Similarly, other modules in the system may have objects of a corresponding type. In a different environment, objects may be word documents, function modules, data structures, and other computer-implemented structures.

Within the complete lifecycle of the project, a number of stages of the project are identified. First, based on the blueprint, an initial version of the enterprise software system is created by copying objects from the object repository to the initial stage or by creating new objects in the initial project stage. When the initial stage is completed, the project moves into an implementation stage within which the created modules are applied to the technical landscape of the company and each module is customized to reflect the specific requirements as defined in the requirements specification. Thus, each module and respectively object is copied from the initial stage to the next stage and the new copied version is modified. After the implementation stage is completed, the project moves to a solution stage, within which the enterprise software system goes "live" (that is, the system goes into production mode) and all business activities are performed using the enterprise software system. In time, the enterprise software system may need to be modified. For example, additional requirements may arise, or improved versions of the objects or modules may be supplied from the software vendor. Thus, a project may have further lifecycle stages such as an upgrade stage or a maintenance stage and objects may have different content in each further lifecycle stage.

In the stages described above, objects exist in a version pertaining to the lifecycle stage; that is, the content of objects changes over time as the system changes in the lifecycle stage. Throughout the complete lifecycle of the enterprise software system, it may be necessary to compare the content of an object or module to the content of an object or module in a different lifecycle stage. For example, in a marketing module, a marketing campaign scenario is defined. The scenario is constructed to include the steps "define target group", "schedule campaign", "manage campaign", and "analyze campaign". If additional requirements arise, the content of the marketing campaign scenario may be adjusted to reflect these additional requirements. After the scenario (i.e. object) is adjusted there may be a need to apply the newly adjusted content to the content of the same object (that is, an object with the same identifier) in another lifecycle (project) stage. Embodiments of the present invention may describe how the content of objects in each lifecycle stage are maintained and stored so that, if there is a need to apply the content of one object in one lifecycle stage to the content of the object in another lifecycle stage, the content may be retrieved from storage, compared, and applied.

FIG. 1 is a block diagram of a system of an embodiment of the invention for maintaining the content of objects in lifecycle stages and applying the content from one lifecycle stage to another lifecycle stage. Referring to FIG. 1, the system 100 has an object repository 110 and a memory 140. The object repository 110 is a central repository for all objects that may be initially used to build modules. The object repository 110 provides objects supplied by the manufacturer of the enterprise software system. New objects may be created in any or all lifecycle stages. The project stage module 115 manages lifecycle stages. Objects are initially supplied in the object repository 110. Objects are copied from the object repository 110 to an initial project stage. The archive version manager 125 saves an archive of each object in the memory 140. The origin matrix builder module 120 creates an origin matrix for each object. The origin matrix lists information about the previous lifecycle stage (or stages if more than one previous stage exists) of the object and the predecessor data of the object. That is, the origin matrix has a column for each lifecycle stage and each column lists an object ID and an ID of the object archive. Every time an object is copied from one lifecycle stage to another lifecycle stage (i.e., a source object is copied to a further lifecycle stage, thus becoming a target object), the origin matrix builder module 120 copies the origin matrix of the source object, associates it with the target object, and overwrites the data in the origin matrix so that it may be retrieved and used at a later time. This is necessary because, over time, the content of objects changes to reflect changes to the enterprise software system. For example, over time, the requirements for a marketing module might change because the company which is the user of the enterprise software system decides to do marketing campaigns differently. Thus, the content of each of the objects that build up the marketing module may be changed to reflect the new requirements so that the marketing module may provide the newly required functionality. With time, many such changes may be performed in one or all of the lifecycle stages of the enterprise software system. Also with time, there may be a need for one version of the content of an object to be applied to another version of the content of an object; that is, the content of an object from one lifecycle stage may need to be applied to the content of the object in a different lifecycle stage. Further, as content in each lifecycle stage changes with time, there may be a need to compare and apply the content of an archive of the time of creation of the object in the lifecycle stage to the current content of the object in a selected lifecycle stage. That is why, it may be necessary to create origin matrices at each lifecycle stage so that all versions of the content of an object from all lifecycle stages may be tracked and retrieved. The usage logic module 135 retrieves usages of objects from lifecycle stages. If the content of an object in one lifecycle stage needs to be compared to the content of the object in another lifecycle stage, the usage logic module retrieves the usages and sends them to the comparison module. The comparison module 130 compares the content of objects (such as current content and archived content) and, if necessary, applies the content of one version of the object to another version of the project.

Figure 2:
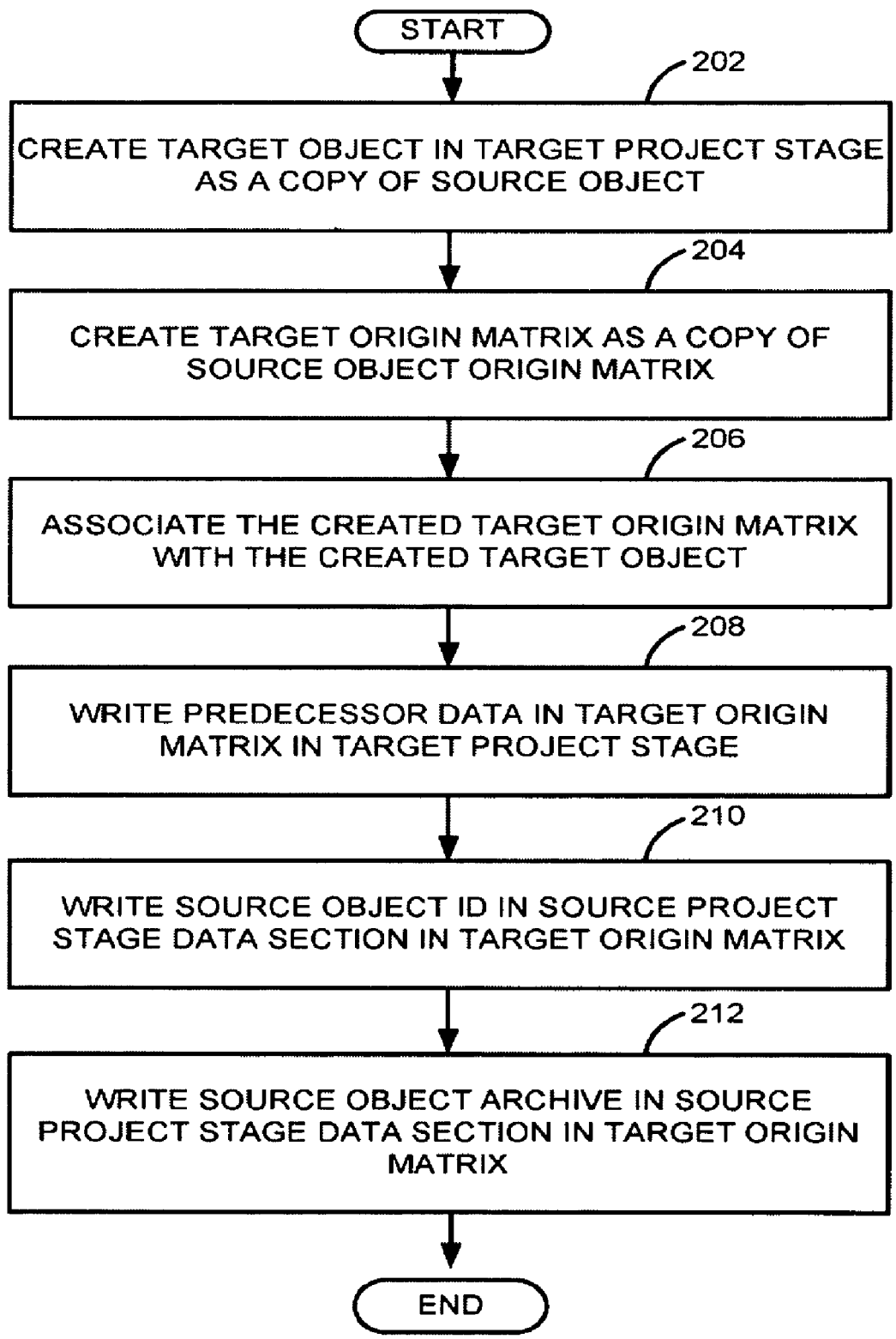
FIG. 2 is a flow diagram of an embodiment of the invention for creating an origin matrix for an object.

FIG. 2 is a flow diagram of an embodiment of the invention for creating an origin matrix for an object. The origin matrix reflects the lifecycle stages of the enterprise software system. That is, the origin matrix has columns for each lifecycle stage and in each column of a lifecycle stage data is recorded when the object moves into that lifecycle stage. Data in the origin matrix represents object IDs and object archive IDs. For example, if there are five lifecycle stages, and an object is currently in lifecycle stage number three, the origin matrix of the object may only have data for stages 1 and 2. Further, the origin matrix records predecessor data, so that it may be estimated how the object was created. For example, if an object is in lifecycle stage number two, the predecessor data column of the origin matrix may list the object ID and archive version ID for the source object from lifecycle stage number one.

Referring to FIG. 2, at process block 202, a source object associated with a source lifecycle stage is copied to a target lifecycle stage. This newly created copy becomes a target object. Thus, after the copy the source object exists in its source lifecycle stage, and the target object exists in its target lifecycle stage. At process block 204, the origin matrix of the source object is copied. At process block 206, the copied origin matrix is associated with the target object. At process block 208, the predecessor data in the copied origin matrix (that is, the target origin matrix) is inserted (i.e. written in the respective column) to reflect the predecessor data of the target object. Thus, the predecessor data is inserted so that it lists the ID of the source object and the archive ID of the source object. At process block 210, the data for the lifecycle stage of the source object, (the ID of the source object) is inserted in the target origin matrix. At process block 212, the archive ID of the source object is inserted in the column with the data for the lifecycle stage of the source object. Using this approach, the system of the embodiment of the invention preserves an origin matrix for each object in each lifecycle stage. The data in the origin matrix is sufficient to retrieve the content of an object from any lifecycle stage and to compare the content of the object to the content of the object in a different lifecycle stage.

In one embodiment of the invention, the process as described in FIG. 2 is performed by components as described in FIG. 1. At process block 202, the project stage module 115 copies a source object from a source lifecycle stage to a target lifecycle stage. This newly created copy becomes a target object. Thus, after the copy, the source object exists in its source lifecycle stage and the target object exists in its target lifecycle stage. At process block 204, the origin matrix builder module 120 copies the origin matrix of the source object. At process block 206, the origin matrix builder module 120 associates the copied origin matrix with the target object. At process block 208, the origin matrix builder module 120 writes the source object ID in the predecessor data column in the target origin matrix and the archive version manager 125 creates and stores an archive of the source object content in the memory 140. At this point in time, the content of the source object is the same as the newly created target object and the stored archive content. However, with time, the content of the source object might change, the content of the target object might change and thus, there will be three different contents that exist in the system: a current source object content, a current target object content, and the archived content. Further, the archived content of the source object at the time of its own creation is also saved. It is important to save an archived version of the source object when the target object is created because in time the archived content may serve as an indicator of the initial content of the target object. Similarly, when the source object was initially created, its archive was saved so that it may serve as an indicator of the initial content of the source object as compared to its current content. At process block 210, the origin matrix builder module 120 writes the data for the source object ID in the source object lifecycle stage section. At process block 212, the origin matrix builder module 120 writes the data for the archive ID of the source object in the lifecycle stage of the source object.

Figure 3:
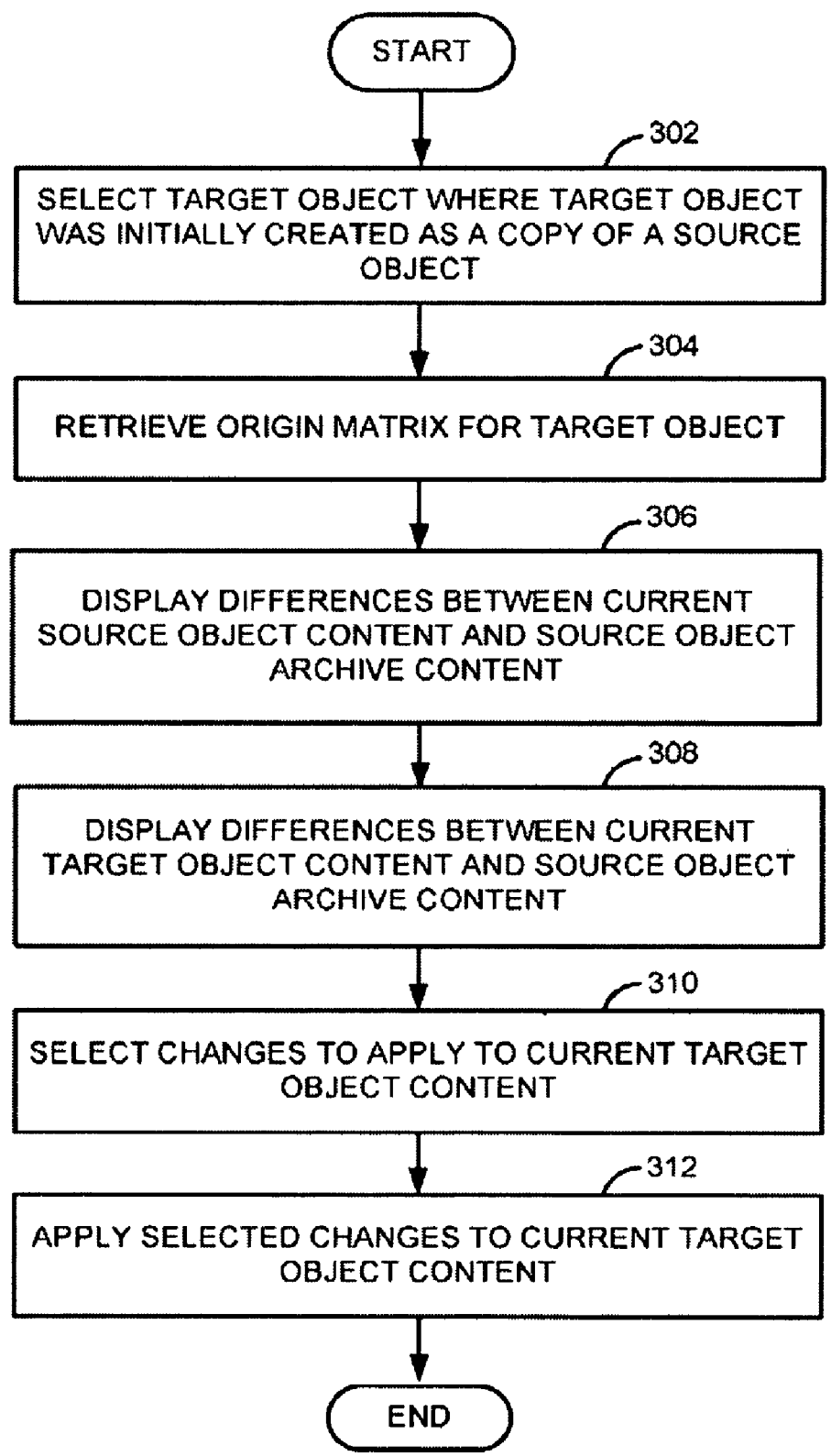
FIG. 3 is a flow diagram of an embodiment of the invention for applying the content of an object from one project stage to the content of the object in a previous project stage.

FIG. 3 is a flow diagram of an embodiment of the invention for applying the content of an object from one lifecycle stage to the content of the object in a subsequent lifecycle stage. Referring to FIG. 3, at process block 302, a target object in a target lifecycle stage is selected. The target object is initially created as a copy of a source object from a source lifecycle stage. At the time of creation of the target object, its initial content, that is, the content of the source object at the time of the copy, is saved in an archive. At the time of creation of the target object, the content of the source object, the content of the target object, and the content of the source object saved in the archive are the same. With time, the content of the target object in the target lifecycle stage changes. Thus, the current content of the target object in its lifecycle stage is different from the archived content of the source object. Also, after the target object is created as a copy of the source object, the source object content may also change in its source lifecycle stage. Thus, at the time when the target object is selected at process block 302, three different content versions may exist in the system. It may be relevant for the enterprise software system to apply some of these differences (e.g., "changes") to the current content of the target object content. At process block 304, the origin matrix of the selected target object is retrieved. At process block 306, the current content of the source object is compared to the content of the source object archive and the differences between the two contents are displayed. The content is retrieved and compared based on the entries in the retrieved origin matrix. At process block 308, the current content of the selected target object is compared with the content of the source object archive and the differences between the two contents are displayed. The content is retrieved and compared based on the entries in the retrieved origin matrix. As mentioned above, from the standpoint of the functionality of the enterprise software system, some changes might be relevant for the target object content. At process block 310, changes (i.e., "differences") are selected from the displayed changes to apply to the current content of the target object. At process block 312, the selected changes are applied to the current content of the target object.

In one embodiment of the invention, the process as described in FIG. 3 is performed by components as described in FIG. 1. At process block 302, the project stage module 115 selects a target object in a target lifecycle stage. At process block 304, the usage logic module 135 retrieves the origin matrix of the selected target object. At process block 306, the comparison module 130 compares the current content of the source object to the content of the source object archive from the memory 140 and displays the differences between the two contents. At process block 308, the comparison module 130 compares the current content of the selected target object with the content of the source object archive from the memory 140 and displays the differences between the two contents. At process block 310, the project stage module 115 selects changes to apply. At process block 312, the project stage module 115 applies the selected changes.

Figure 3A:
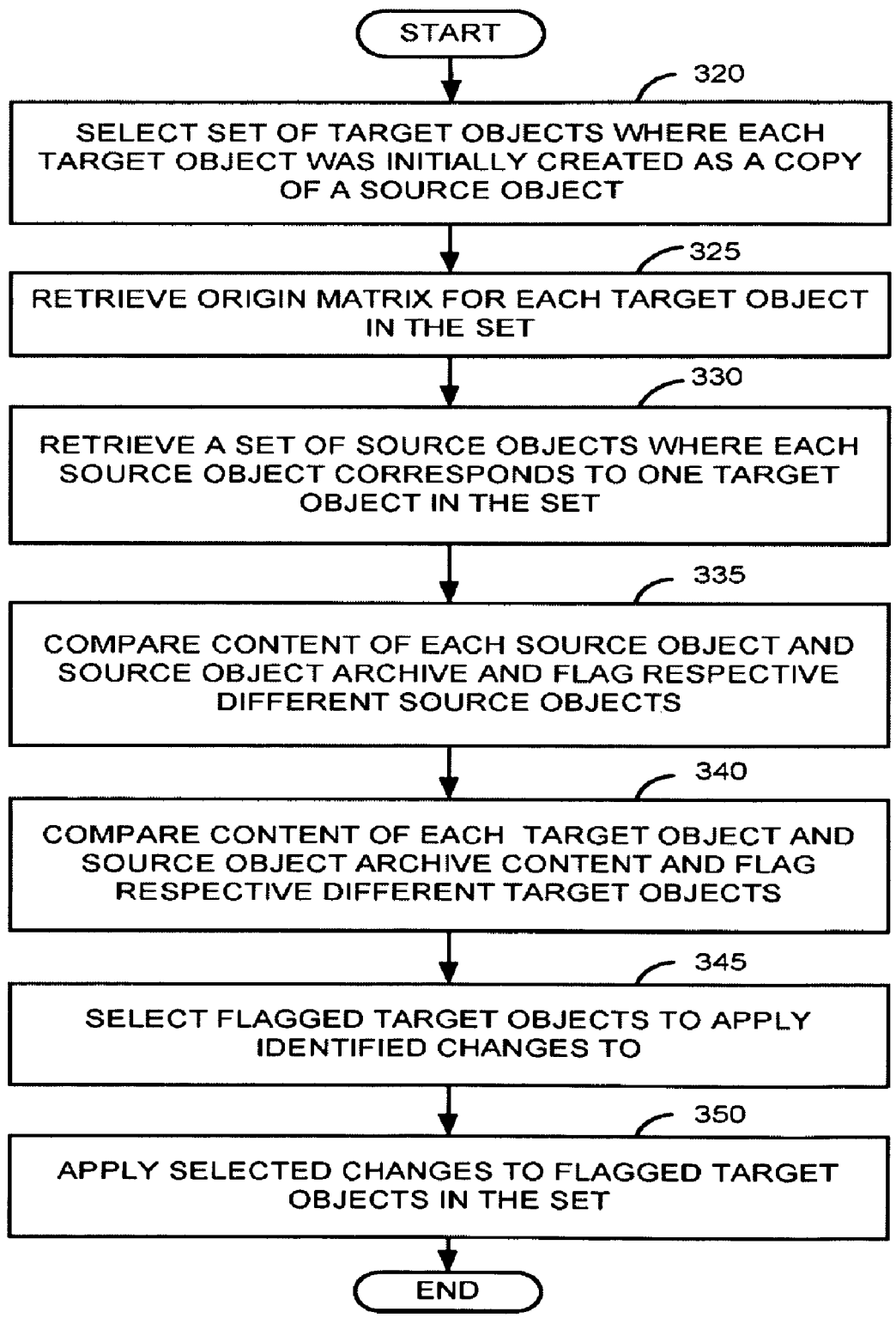
FIG. 3A is a flow diagram of an embodiment of the invention for comparing a set of objects from one project stage to a set of objects in a previous project stage.

In another embodiment of the invention, the process as described in FIG. 3 is performed for a set of objects at a time. For example, it may be necessary to compare one version of a module with another version of a module, that is, to compare one version of all objects that build up the module with another version of all objects that build up the module. FIG. 3A is a flow diagram of an embodiment of the invention for comparing a set of objects from a further lifecycle stage to a set of objects in a previous lifecycle stage. Referring to FIG. 3A, at process block 320, a set of target objects in a target lifecycle stage is selected. Each of these objects is initially created as a copy of an object from a previous lifecycle stage. At process block 325, the origin matrix of each of the target objects in the set is retrieved. The origin matrix is retrieved in order to identify source objects that were used to create each of the target objects. At process block 330, a set of source objects is retrieved using the origin matrices. Each of the set of source objects corresponds to one of the target objects in the set of target objects. At process block 335, the content of each of the retrieved source objects is compared to an archive of the source object and if changes are identified, the respective source objects are flagged. At process block 340, each target object in the set is compared with its corresponding source object archive and if changed objects are identified, the respective changed objects are flagged. At process block 345, flagged target objects are selected to apply identified changes to. At process block 350, the changes are applied to the selected flagged objects.

Figure 4:
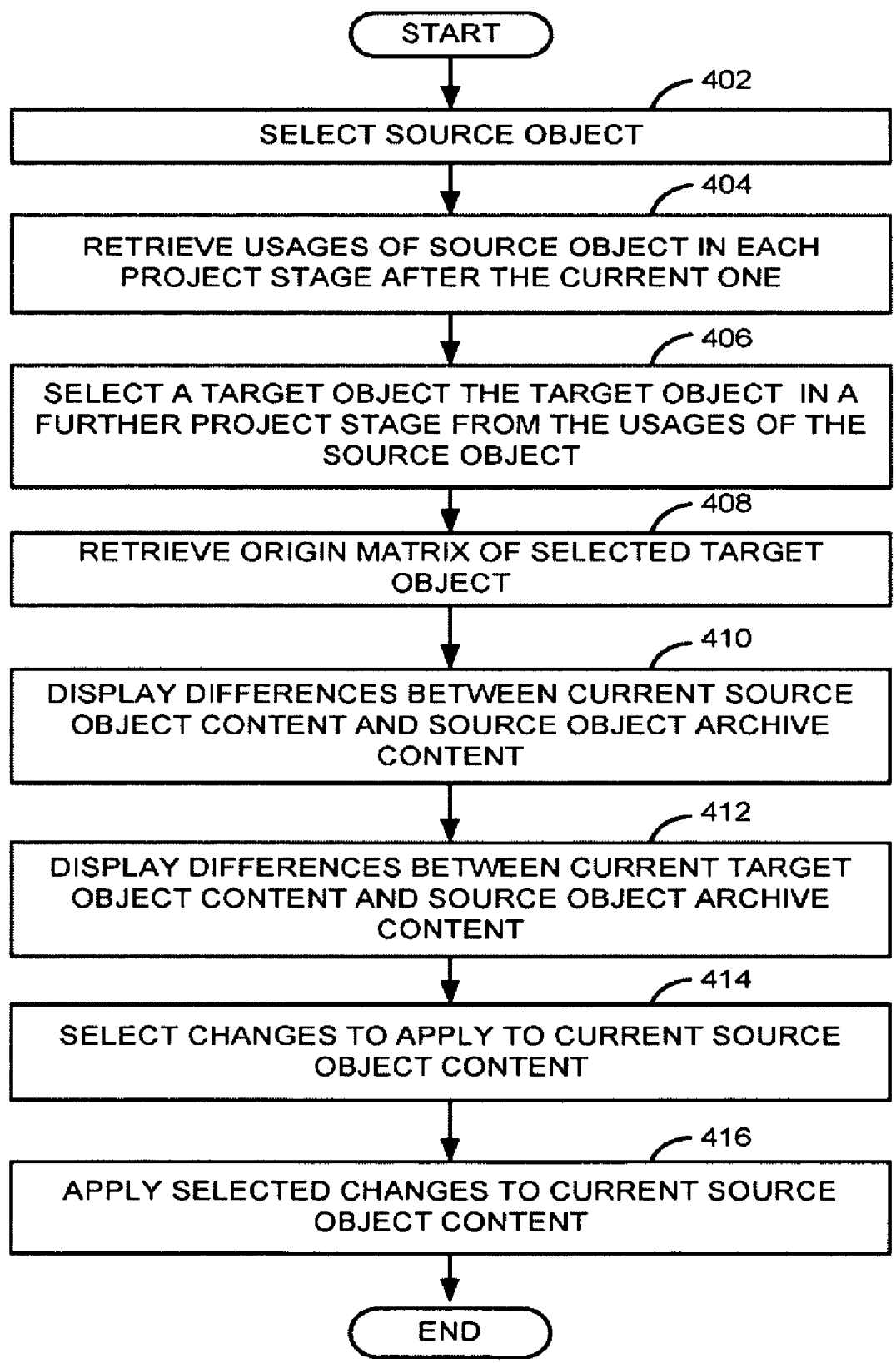
FIG. 4 is a flow diagram of an embodiment of the invention for applying the content of an object from one project stage to the content of the object in a further project stage.

FIG. 4 is a flow diagram of an embodiment of the invention for applying the content of an object from a consequent lifecycle stage to the content of the object in a previous lifecycle stage. Referring to FIG. 4, at process block 402, a source object is selected. At process block 404, the usages of the selected source object in all consequent lifecycle stages are retrieved. For example, if three usages of the source object are retrieved, each usage represents an object in a lifecycle stage ("LS"), that is, object1 in LS1, object2 in LS2, and object3 in LS3. Each of the three objects is initially created as a copy of the object from the previous lifecycle stage. That is, object1 from LS1 is created as a copy of the source object. Object2 from LS2 is created as a copy of object1 from LS1. Object3 is created as a copy of object2 from LS2. The content of each object is archived at the time of its creation. However, the source object, object1, object2, and object3 are not created at the same time. Thus, between the creation of object1 and object2, the content of object1 might have changed. Consequently, the content of the source object, the current content of object1, the content of the archive of object1, and the newly created object2 may be different. Thus, the current content of objects and their archived content differs because over time changes are made to them. From the standpoint of the enterprise software system it may be relevant to apply the content of the source object to the content of an object in a further lifecycle stage. For example, after a comparison, it may be relevant to apply the content of the source object to the current content of object2 in LS2. Similarly, it may be relevant to apply the content of the archive version of the source object that was saved at the time of creation of the source object to the current content of object2 in LS2, and vice versa.

Because different needs and requirements may arise throughout the lifecycle of the enterprise software system, a comparison of the content of the source object, the content of the archive of the source object, and a chosen object from a further lifecycle stage may be necessary. To perform this comparison, at process block 406, one object is selected from the retrieved usages of the source object to be the target object for the comparison. At process block 408, the origin matrix of the selected target object is retrieved. At process block 410, the current content of the source object is compared to the archive content of the source object and the differences (i.e., changes made to the source object since it was created) are displayed. At process block 412, the current content of the selected target object is compared to the content of the archive of the source object and the differences are displayed. At process block 414, one of the displayed set of changes is selected to be applied to the current content of the selected source object. At process block 416, the selected changes are applied to the current content of the selected source object.

In one embodiment of the invention, the process as described in FIG. 4 is performed by components as described in FIG. 1. Referring to FIGS. 1 and 4, at process block 402, the project stage module 115 selects a source object. At process block 404, the usage logic module 135 retrieves the usages of the selected source object in all consequent lifecycle stages. At process block 406, the project stage module 115 selects a target object from the retrieved usages. At process block 408, the project stage module 115 retrieves the origin matrix of the selected target object. At process block 410, the comparison module 130 compares the current content of the source object to the archive content of the source object from the memory 140 and displays the differences (i.e., changes made to the source object since it was created) between the two contents. At process block 412, the comparison module 130 compares the current content of the selected target object to the content of the archive of the source object from the memory 140 and displays the differences between the two contents. At process block 414, the project stage module 115 selects one of the displayed set of changes to be applied to the current content of the selected source object. At process block 416, the project stage module 115 applies the selected changes to the current content of the selected source object.

Figure 4A:
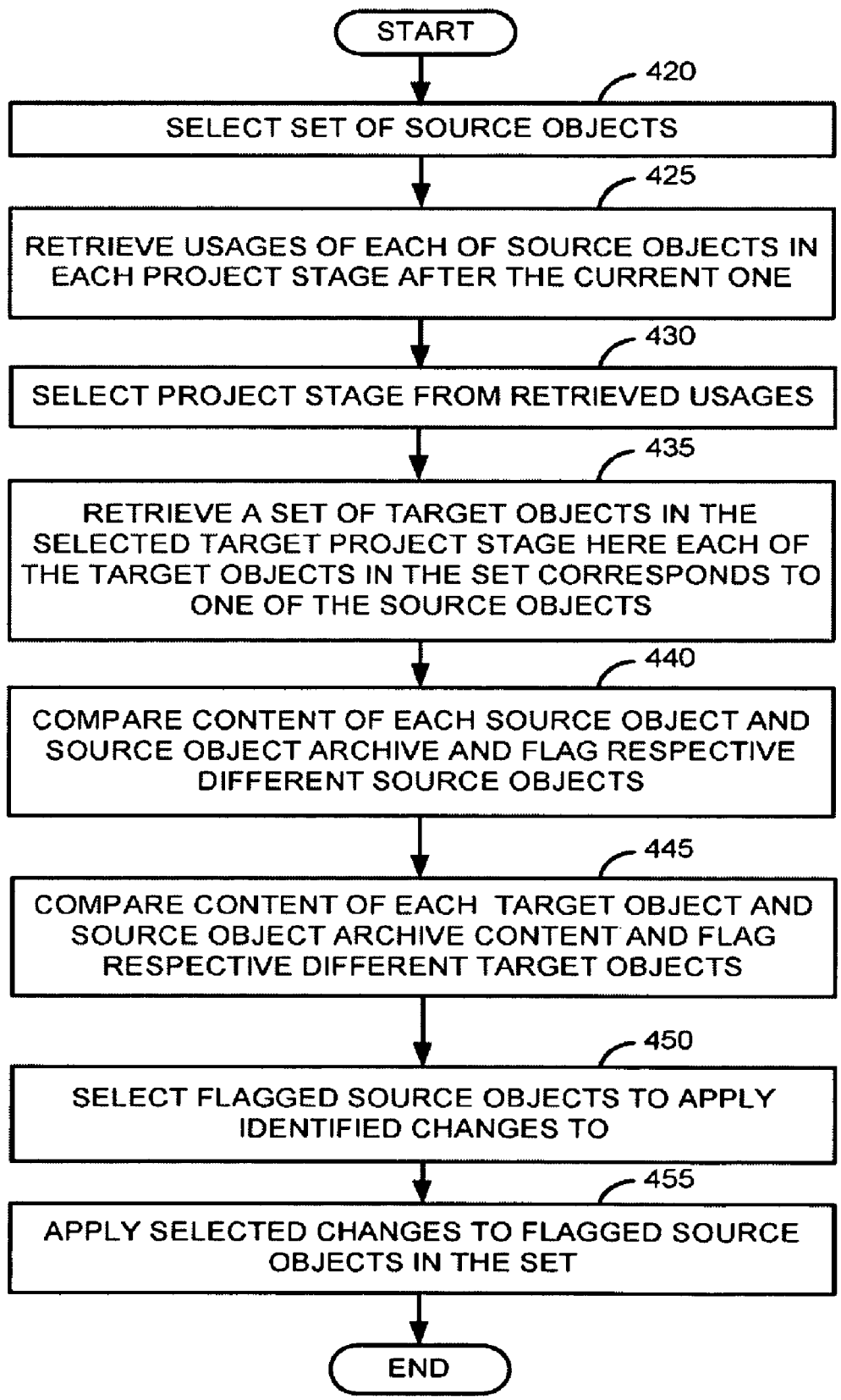
FIG. 4A is a flow diagram of an embodiment of the invention for comparing a set of objects from one project stage to a set of objects in a further project stage.

In another embodiment of the invention, the process as described in FIG. 4 is performed for a set of objects at a time. For example, it may be necessary to compare one version of a module with another version of a module (that is, comparing one version of all objects that build up the module with another version of all objects that build up the module). FIG. 4A is a flow diagram of an embodiment of the invention for comparing a set of objects from one lifecycle stage to a set of objects in a consequent lifecycle stage. Referring to FIG. 4A, at process block 420, a set of source objects in a source lifecycle stage is selected. At process block 425, the usages of each of the source objects in each lifecycle stage after the current one are retrieved. At process block 430, one lifecycle stage from the retrieved usages is selected. At process block 435, a set of target objects in the selected target object lifecycle stage is retrieved. Each of the target objects in the set corresponds to one source object in the set of source objects. At process block 440, the content of each of the source objects in the set is compared to the content of the archives of the source objects and if changes are identified, the respective source objects are flagged. At process block 445, each target object in the set is compared with each source object archive and if changed objects are identified, the respective changed objects are flagged. At process block 450, flagged source objects are selected to apply identified changes to. At process block 455, the changes are applied to selected flagged objects.

Figure 5:
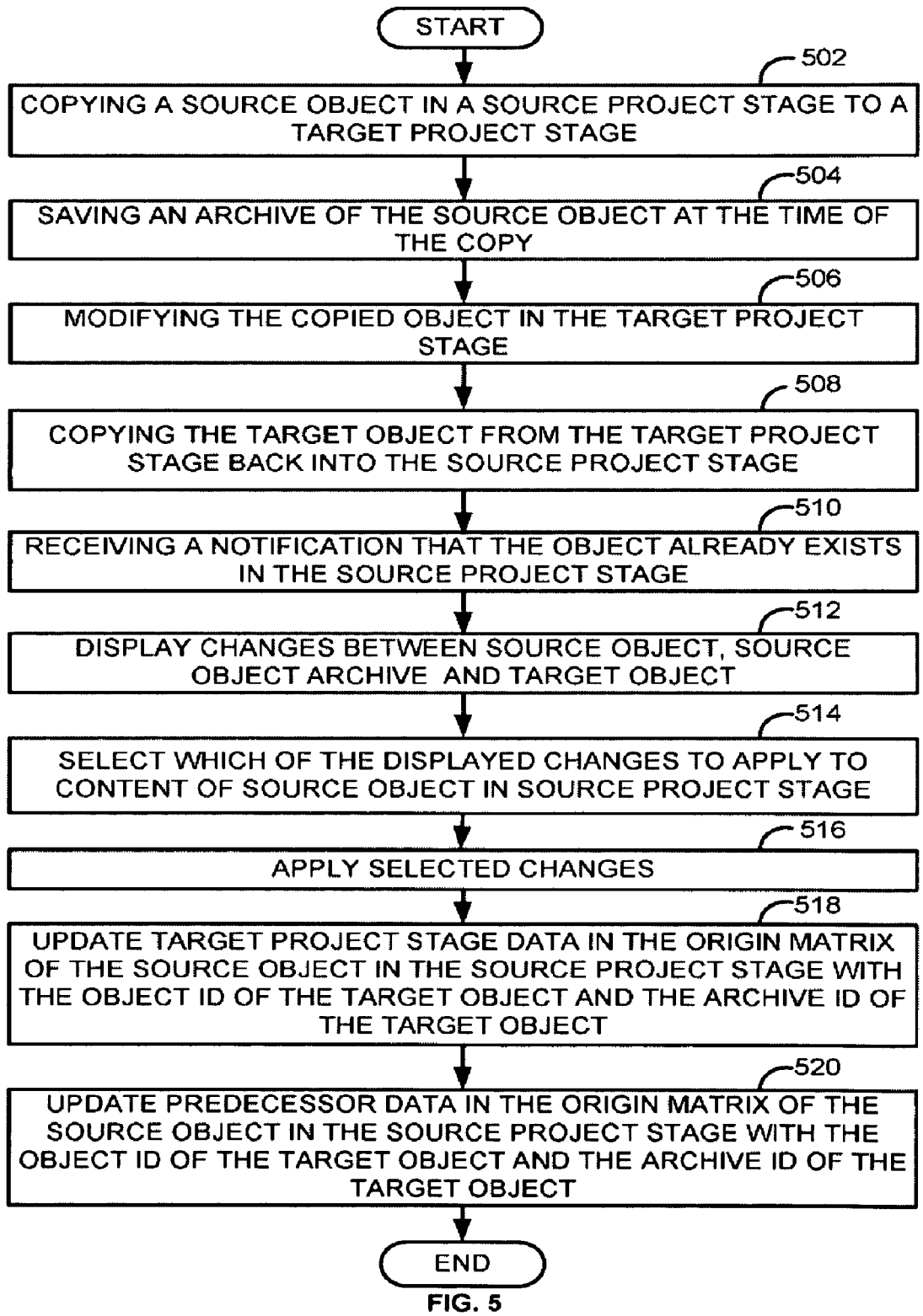
FIG. 5 is a flow diagram of an embodiment of the invention for merging the content of objects from two project stages.

In another embodiment of the invention, content of objects is compared and merged as necessary. FIG. 5 is a flow diagram of an embodiment of the invention for merging the content of objects from two lifecycle stages. Such a merge may be necessary, if, for example, an object exists in a lifecycle stage, then the object is copied to a different lifecycle stage and there is an attempt to copy the modified object in the original lifecycle stage. At this point, there is a conflict because the object already exits. Thus, it may be necessary to provide a way to compare and merge the two versions (i.e., the original one and the modified one). Referring to FIG. 5, at process block 502, a source object from a source object lifecycle stage is copied to a target object in a target object lifecycle stage. At process block 504, an archive of the source objects is saved so that the content of the source object at the time of copy may be retrieved for later reference. At process block 506, the copied target object is modified in its target lifecycle stage. At process block 508, the target object is copied back into the source lifecycle stage. Because the source object already exists in the source lifecycle stage, at process block 510, a notification is received that there is a conflict because the source object already exists in the source lifecycle stage. At process block 512, the differences between the source object content, the target object content, and the source object archive content are identified and displayed. At process block 514, changes from the displayed changes are selected to be applied to the source object content in the source object lifecycle stage. At process block 516, the selected changes are applied. At process block 518, the data for the target lifecycle stage in the origin matrix of the source object in the source lifecycle stage is updated with the object identifier of the target object and the identifier of the archive of the target object. At process block 520, the predecessor data in the origin matrix of the source object is updated with the object identifier of the target object and the identifier of the archive of the target object.

Figure 6:
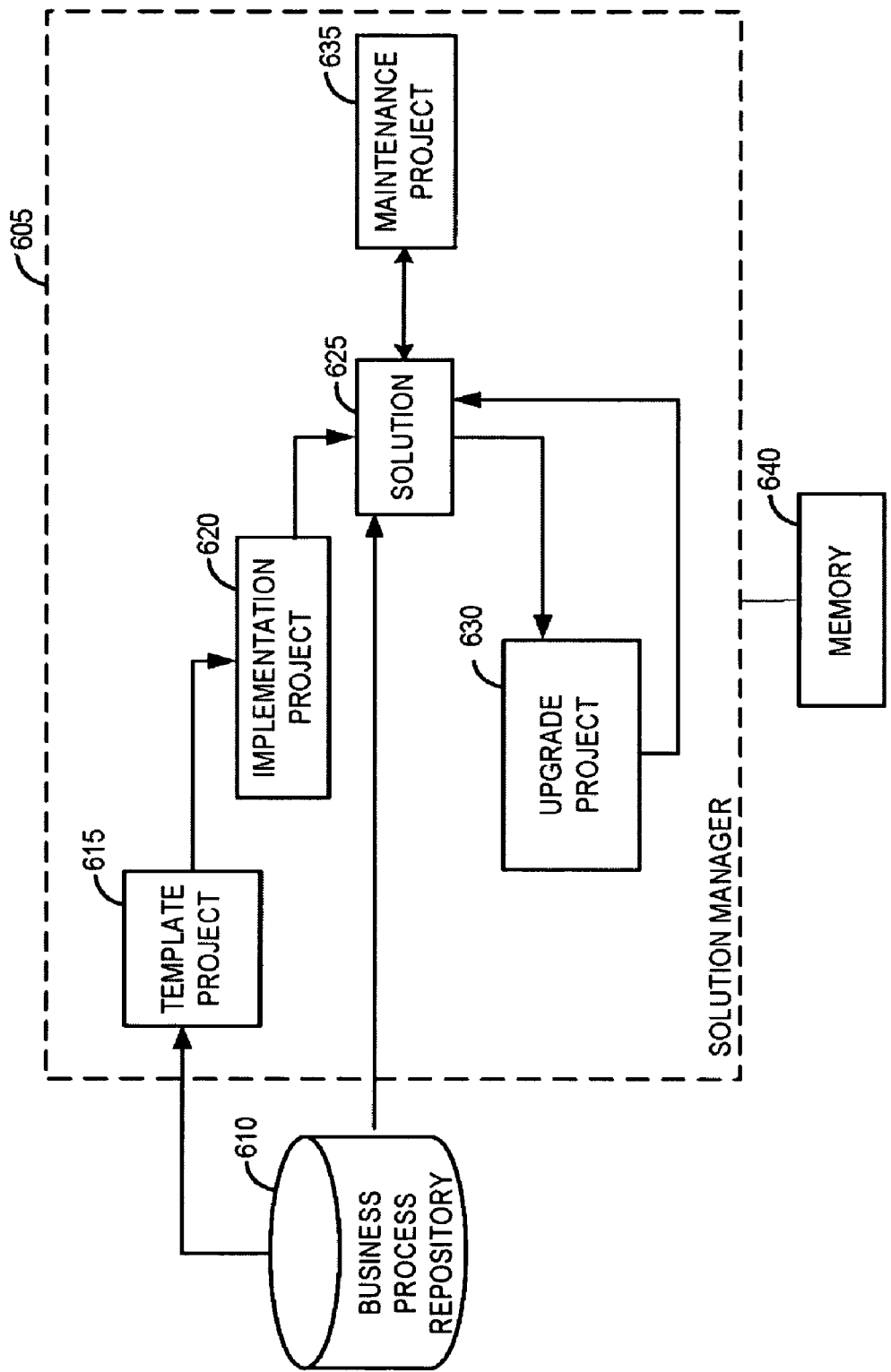
FIG. 6 is a block diagram of a system of another embodiment of the invention for tracking versions of objects and applying the content of versions from one stage to another stage in a project.

FIG. 6 is a block diagram of a system of another embodiment of the invention for maintaining versions of objects and applying the content of versions from one lifecycle stage to another lifecycle stage in a project. Referring to FIG. 6, the business process repository 610 maintains objects that may be used to create an enterprise software system. The solution manager 605 manages all stages of the project. The solution manager 605 maintains a separate version for each object in each lifecycle stage, namely, template project 615, implementation project 620, and solution 625. Throughout the lifecycle of each object, the solution manager 605 stores an archive version of the content of each object for each lifecycle stage in the memory 640. Further, at each lifecycle stage, the solution manager maintains an origin matrix for the object for later use.

In one embodiment, a project may have an upgrade stage 630. In the upgrade project stage 630, objects are copied from the solution 625 and updated or upgraded with new content. In one embodiment, objects are brought back into the solution 625 after being updated or upgraded.

In another embodiment, a project has a maintenance stage 635. Objects may be copied to the maintenance stage 635 to be improved, repaired, for patches to be applied, and so on. In one embodiment, objects are brought back into the solution 625 after going through the maintenance stage 635.

FIG. 7 is an exemplary origin matrix that may be used by the components of FIG. 6. Referring to FIG. 7, the origin matrix 700 may list the source object ID and the archive version ID of an object in all its lifecycle stages, such as Business Process Repository (BPR), Template Project (TP), Implementation Project (PRO), Solution (SOL). Further, the origin matrix 700 records the source object ID and archive version of the object per lifecycle stage. When the object is copied from one lifecycle stage to the next, the origin matrix is also copied, and the data in the origin matrix is overwritten (or inserted if there is no prior data) to reflect the current stage.

Referring to the components of FIG. 6, in an exemplary embodiment, let $O_i^j$ be an object, where O is the object, i is the object identity and j is an indicator for the version of an object. Thus, j represents different states of the same object at different points in time (that is, different versions in the same lifecycle stage). Objects with the same identity, but a different version index, have the same object identifier but may have different content assigned. Let $O_1^0$ be an object in the business process repository 610. When $O_1^0$ is copied into a template project 615, the copy $O_2^0$ is associated with the following origin matrix:

|  | Stage | | | | |
| --- | --- | --- | --- | --- | --- |
|  | Business Process Repository (BPR) | Template Project (TP) | Implementation Project (PRO) | Solution (SOL) | Predecessor Data (PRE) |
| Origin ID | $O_1^0$ |  |  | $O_1^0$ |  |
| Archive Version | Arch $(O_1^0)$ |  |  | Arch $(O_1^0)$ |  |

If $O_2^0$ is changed until it is copied to the next stage, the adapted object is called $O_2^1$. When the template project 615 stage completes, $O_2^1$ is copied into the implementation project 620 and the newly created copy is named $O_3^1$. $O_3^1$ is in turn associated with the following origin matrix:

|  | Stage | | | | |
| --- | --- | --- | --- | --- | --- |
|  | BPR | TP | PRO | SOL | PRE |
| Origin ID | $O_1^0$ | $O_2^1$ |  |  | $O_2^1$ |
| Archive Version | Arch $(O_1^0)$ | Arch $(O_2^1)$ |  |  | Arch $(O_2^1)$ |

If $O_3^0$ is changed before it is copied to the next lifecycle stage, the adapted object is called $O_3^1$. When the Implementation Project 620 stage completes, $O_3^1$ is copied into the next lifecycle stage, the Solution 625, and the copy is called $O_4^0$. $O_4^0$ is associated with the following origin matrix:

|  | Stage | | | | |
| --- | --- | --- | --- | --- | --- |
|  | BPR | TP | PRO | SOL | PRE |
| Origin ID | $O_1^0$ | $O_2^1$ | $O_3^1$ |  | $O_3^1$ |
| Archive Version | Arch $(O_1^0)$ | Arch $(O_2^1)$ | Arch $(O_3^1)$ |  | Arch $(O_3^1)$ |

If $O_4^0$ is changed before it is copied to the next stage, the adapted object is called $O_4^1$. When the Solution 625 stage completes, $O_4^1$ is copied to the Upgrade Project 530 and called $O_5^0$. $O_5^0$ is associated with the following origin matrix:

|  | Stage | | | | |
| --- | --- | --- | --- | --- | --- |
|  | BPR | TP | PRO | SOL | PRE |
| Origin ID | $O_1^0$ | $O_2^1$ | $O_3^1$ | $O_4^1$ | $O_4^1$ |
| Archive Version | Arch $(O_1^0)$ | Arch $(O_2^1)$ | Arch $(O_3^1)$ | Arch $(O_4^1)$ | Arch $(O_4^1)$ |

In an alternative embodiment, if $O_4^0$ does not change before it is copied, the SOL column would have the entry $O_4^0$ in the Origin ID row and Arch$(O_4^0)$ in the Archive Version row.

In an Upgrade Project 630 lifecycle stage, objects are modified and improved. After the Upgrade Project 630, there may be a need to apply the modified content of an object in that stage to the content for a previous lifecycle stage, such as Solution 625, as exemplary shown on FIG. 6. In this case, it might not be sufficient to copy the object back into the solution since the user might want to replace the object in the solution with the new one from the Upgrade Project 630. There may be a need to replace the object content but keep the object identity so that any data that is associated with the object in the Solution 625 (that is, operational data) and is not part of the Upgrade project 630, is kept. Between the time $O_4^1$ is copied into the Upgrade Project 630 and the time when $O_5^1$ is to be inserted back into the Solution 625, $O_4^1$ might have been changed. This adapted (i.e., "changed") object is called $O_4^2$. Thus, $O_4^2$ is associated with the origin matrix of $O_4^0$ and $O_5^1$ with the origin matrix of $O_5^0$ (as given above). To merge $O_5^1$ into the Solution 625, the following steps are performed. The system checks whether an object with the same identifier as the value of the origin matrix for the solution column already exists in the Solution 625. In this example, an object with identifier $O_4$ is to be searched since $O_4^1$ is the origin ID. This will identify $O_4^2$ in the solution. The system checks whether the predecessor origin ID in the origin matrix of the object that is to be inserted is the same as the origin ID in the SOL column of that object. In this case, both values are $O_4^1$. This check ensures that the object is not a copy that has been created in an additional step. The system performs a three-way comparison and provides a compare dialogue that shows the differences between $O_5^1$–Arch$(O_4^1)$–$O_4^2$. A user may then adjust the new version of $O_4$ by merging the different objects without loosing the object identity. In this example, this will lead to object $O_4^3$ which will be associated with the following origin matrix:

|  | Stage | | | | |
| --- | --- | --- | --- | --- | --- |
|  | BPR | TP | PRO | SOL | PRE |
| Origin ID | $O_1^0$ | $O_2^1$ | $O_5^1$ |  | $O_5^1$ |
| Archive Version | Arch $(O_1^0)$ | Arch $(O_2^1)$ | Arch $(O_5^1)$ |  | Arch $(O_5^1)$ |

Using the approach described above, the Solution Manager 605 may apply the content of an object from any lifecycle stage to the content of an object from a selected other lifecycle stage. This is beneficial in cases involving complex Information Technology (IT) landscapes where thousands of modules may make up an enterprise system. For example, if large amounts of data have to be migrated, the approach described above may be used to analyze the content of objects and modules respectively, compare between versions, and apply selected content.

It should be appreciated that embodiments of the present invention are not limited to the described architectures of FIGS. 1 and 6. In alternate embodiments of the invention, systems may be implemented to accommodate any number of lifecycle stages with any number of layers inside each stage.

In one embodiment of the invention, a system is implemented with n different stages $S_1, \ldots S_n$ and each stage $S_i$ is associated with several ($m_i$) layers $L_{i1}, \ldots S_{im_i}$. In another embodiment, each stage $S_i$ may represent a project stage. An exemplary origin matrix of the system has the following structure:

|  | Stage | | | |
| --- | --- | --- | --- | --- |
|  | $S_1$ | $S_2$ | ... $S_n$ | Predecessor |
| Origin ID | ID of $S_1$ object origin | ID of $S_2$ object origin | ID of $S_n$ object origin | ID of predecessor object origin |
| Archive Version | Archive version of $S_1$ origin | Archive version of $S_2$ origin | Archive version of $S_n$ origin | Archive version of predecessor origin |

The predecessor column in the exemplary origin matrix above is a fixed stage that stores the predecessor information. Data in the predecessor column may be used to merge data if required, for example, if an object $O_k^l$ is inserted into a stage $S_i$ from stage $S_j$. In one case, stage $S_j$ may come after stage $S_i$ which means that the object may exist in $S_i$ already and there may be a need to merge the object from $S_j$ with the object from $S_i$. Alternatively, in another case, the object may have been created in $S_j$ for the first time and no merge is necessary.

To estimate if a merge is necessary, the system may analyze the content of the origin matrix as follows: if the origin ID of stage $S_i$ in the origin matrix of $O_k^l$ is the same as one of the objects of stage $S_i$ (i.e., an object $O_k^{l-1}$ exists), and the predecessor ID of the origin matrix of $O_k^l$ is the same as the one for stage $S_i$, then the system estimates that $O_k^l$ was copied from stage $S_i$ to stage $S_j$ first and should be inserted back into stage $S_i$. In such a case, a special functionality for the merge of $O_k^l$ and $O_k^{l-1}$ may be provided.

If an object is copied from one layer to another layer of the same stage (i.e., copy from $L_{ij}$ to $L_{ik}$), the origin matrix of stage $S_i$ and the predecessor column are overwritten. An exemplary origin matrix may be constructed as follows:

|  | Stage 1 | Stage 2 | Stage 3 | Stage 4 | Stage 5 |
| --- | --- | --- | --- | --- | --- |
| Layer 1 | S1-L11 | S2-L21 | S3-L31 | S4-L41 | S5-L51 |
| Layer 2 | S1-L12 | S2-L22 |  | S4-L42 | S5-L52 |
| Layer 3 | S1-L13 |  |  | S4-L43 |  |
|  |  |  |  | S4-L44 |  |

Following the approach described above, embodiments of the invention may accommodate different scenarios to serve specific needs.

Elements of embodiments of the invention described herein may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computing system, comprising:
one or more processors;
one or more non-transitory memory devices, the memory devices having stored thereon instructions related to:
an object repository to maintain a set of objects;
an origin matrix builder module to build an origin matrix for an object wherein the object transitions from a source object in a first project stage to a target object in a second project stage, and wherein the origin matrix includes:
a first column to represent the first project stage;
a second column to represent the second project stage; and
a row to represent an origin identifier for the source object in one or more of the first column and the second column;
a matrix repository to store the origin matrix of the object; and
a project stage module to:
maintain the object in a set of project stages;
copy the source object from the first project stage to the target object in the second project stage;
copy an origin matrix of the source object in the first project stage to a target origin matrix in the second project stage of the target object;
associate the target origin matrix in the second project stage with the target object in the second project stage;
write data related to the first project stage in the target origin matrix; and
write predecessor data for the target object in a predecessor column in the target origin matrix.

2. The computing system of claim 1, further comprising instructions related to a comparison module to compare an object in the first project stage to an object in the second project stage using the origin matrix of the object in the second project stage.

3. The computing system of claim 1, further comprising instructions related to a usage logic module to retrieve usages of the object from the set of project stages using the origin matrix of the object.

4. The system of claim 1, wherein at least one of the set of project stages is a lifecycle stage.

5. A computerized method executing on a processor, the method comprising:
- the processor copying a source object from a first project stage to a target object in a second project stage;
- the processor copying an origin matrix of the source object in the first project stage to a target origin matrix in the second project stage of the target object;
- the processor associating the target origin matrix in the second project stage with the target object in the second project stage, wherein the target origin matrix includes:
- a first column to represent the first project stage;
- a second column to represent the second project stage; and
- a row to represent an origin identifier for the source object in one or more of the first column and the second column;
  - the processor writing data about the first project stage in the target origin matrix; and
  - the processor writing predecessor data for the target object in a predecessor column in the target origin matrix.

6. The method of claim 5, wherein writing the predecessor data comprises:
- inserting an object identifier of the source object in a predecessor column of the target origin matrix; and
- inserting an archive identifier of a saved archive of the source object in the predecessor column of the target origin matrix.

7. The method of claim 5, wherein writing the data about the first project stage in the target origin matrix comprises:
- inserting an object identifier of the source object in the first project stage column of the target origin matrix; and
- inserting an archive identifier of a saved archive of the source object in the first project column of the target origin matrix.

8. A non-transitory machine readable medium having instructions therein that when executed by the machine, cause the machine to:
- copy a source object from a first project stage to a target object in a second project stage;
- copy an origin matrix of the source object in the first project stage to a target origin matrix in the second project stage of the target object;
- associate the target origin matrix in the second project stage with the target object in the second project stage, wherein the target origin matrix includes:
- a first column to represent the first project stage;
- a second column to represent the second project stage; and
- a row to represent an origin identifier for the source object in one or more of the first column and the second column;
- write data about the first project stage in the target origin matrix; and
- write predecessor data for the target object in a predecessor column in the target origin matrix.

9. The machine-readable medium of claim 8, further comprising instructions that cause the machine to maintain origin matrices for each object in one or more layers in one or more project stages.

10. The machine-readable medium of claim 8, wherein the instructions causing the machine to write predecessor data, cause the machine to:
- insert an object identifier of the source object in a predecessor column of the target origin matrix; and
- insert an archive identifier of a saved archive of the source object in the predecessor column of the target origin matrix.

11. The machine-readable medium of claim 8 wherein the instructions causing the machine to write data in the target origin matrix for the first project stage, cause the machine to:
- insert an object identifier of the source object in the first project stage column of the target origin matrix; and
- insert an archive identifier of a saved archive of the source object in the first project column of the target origin matrix.

* * * * *